Feb. 24, 1931.                C. H. BREWSTER                 1,793,584
                              WINDSHIELD WARMER
                              Filed March 28, 1930
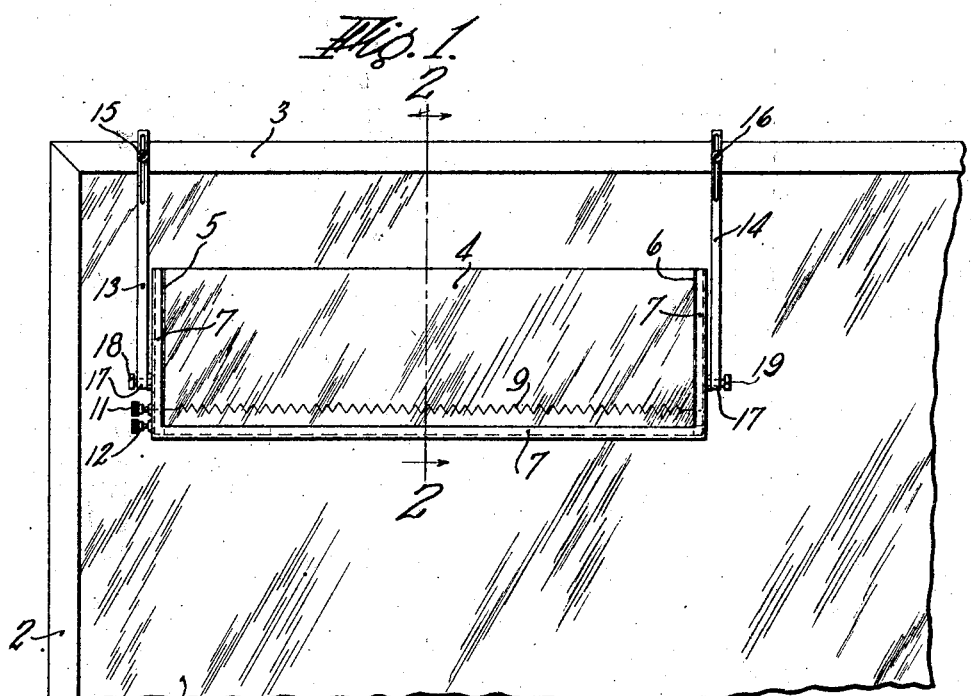
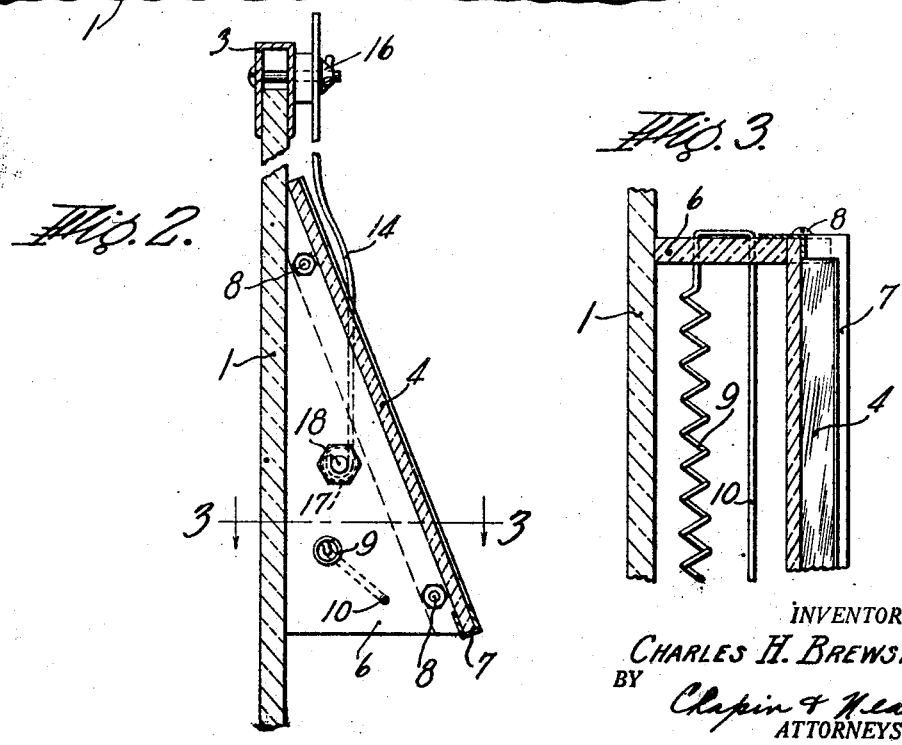
INVENTOR.
CHARLES H. BREWSTER
BY Chapin & Neal
ATTORNEYS.

Patented Feb. 24, 1931

1,793,584

UNITED STATES PATENT OFFICE

CHARLES H. BREWSTER, OF MIDDLETOWN, CONNECTICUT

WINDSHIELD WARMER

Application filed March 28, 1930. Serial No. 439,814.

This invention relates to a warming device for automobile windshields and the like, and the object of the invention is to provide an improved and simplified construction of such device adapted to be mounted against the windshield for warming a localized area of the same and preventing the formation of frost or ice upon the windshield in cold weather.

In the usual device of this character wherein a confined air space is provided against the windshield heated by an electrical heating unit, it sometimes occurs that the temperature of the confined heated air may rise sufficiently high to crack or spoil the windshield. The new laminated windshield of glass and celluloid are particularly sensitive to any abnormal heating effect. An important feature of the present device, therefore, is that it is arranged to pocket warm air against the windshield but in such a manner as to permit free circulation of air out of the bottom of the device and thus avoid the possibility of the heated air becoming hot enough to crack the windshield, which is apt to occur if the heated air is too closely confined. A further object of the invention is to provide a device wherein the vision therethrough is substantially unobstructed by the heating elements or frame mounting of the device.

Further objects and advantages of the invention will become apparent from the following description taken in connection with the drawings which show a preferred embodiment of the invention, and in which:

Fig. 1 is a partial front view of an automobile windshield and its frame showing the device mounted thereon;

Fig. 2 is a vertical section along line 2—2 of Fig. 1; and

Fig. 3 is a horizontal section along line 3—3 of Fig. 2.

In said drawings, the windshield is indicated at 1 and its frame at 2, the top rail of which is indicated at 3. The warming device comprises a small pane of glass 4, held between triangular shaped end pieces 5 and 6 which are preferably made of insulating material such as bakelite and may be united by a suitable grooved border frame 7 for holding the glass 4 therein. As shown, the frame 7 may be integral with side members L-shaped in section and the bottom member U-shaped to hold the glass 4, and said frame is fastened to the end pieces 5 and 6 by bolts 8. This frame, together with its pane of glass 4, is adapted to rest against the windshield (as shown in Fig. 2) so that the glass 4 sets at an angle to the windshield 1 with its upper edge in contact therewith and its lower edge spaced therefrom, and together with the end members 5 and 6 form a pocket on the inside of said windshield 1. The end members 5 and 6 serve as the end closures for the pocket thus formed.

A suitable electrical heating element such as resistance wire 9 with its return wire 10 is mounted near the bottom open side of said pocket, and said wire may be carried through the end members 5 and 6, as shown. The terminals 11 and 12 for the wires 9, 10 are mounted in the end member 6, as shown. It will be understood that suitable connections may be made from said terminals 11 and 12 to a source of electrical current, such as the battery of a car.

The means for supporting the device from the windshield preferably consists of two spring metal straps 13 and 14, which at their upper ends are adjustably fastened at 15 and 16 to the top rail of the windshield frame. The lower ends of such straps 13 and 14 are bent into the form of open hooks 17 (as shown in Fig. 2) for engaging studs 18 and 19 fixed to the end members 5 and 6. The straps 13 and 14 are made with spring tension so as to tend to press the studs 18 and 19 and thereby the glass 4 and the end members 5, 6 firmly against the windshield so as to effectively close the upper and side edges of said pocket against escape of air. It is not necessary, however, that this contact be equivalent to a hermetically sealed joint as a slight escape of air from the pocket at the edges will not destroy the effectiveness of the device. The device may be easily detached from the windshield by unhooking the studs 18 and 19 from the lower edge of straps 13 and 14 and swinging said straps upwardly against the top rail 3 of the windshield frame.

The operation of the device will be clearly apparent from the foregoing description. The heating elements 9 and 10 warm up the air near the bottom of the pocket, which naturally rises to remain within the pocket. However, the open bottom side of the pocket prevents this heated air from reaching a high enough temperature to crack the windshield. Furthermore, it will be observed that the heating elements are located at such position in the pocket as not to interfere with a clear vision through the inclined glass 4.

What I claim is:

1. A warming device for automobile windshields and the like comprising a relatively small glass pane mounted at an angle to said windshield and in approximate contact therewith at its upper edge, end closures at each side edge of said glass pane forming therewith a pocket open downwardly, electrical heating means in said pocket near the open bottom thereof, and means for supporting said device to press it yieldingly against the windshield.

2. A warming device for automobile windshields and the like comprising a relatively small glass pane set at an angle to said windshield and in approximate contact therewith at its upper edge, a frame for holding said small pane comprising end closures at each side edge of said small pane and forming therewith a pocket open downwardly, electrical heating means carried by said frame adjacent the bottom open end of said pocket, and means for supporting said frame with the end closures in pressing contact with said windshield.

3. A warming device for automobile windshields and the like comprising a relatively small glass pane set at an angle to said windshield and in approximate contact therewith at its upper edge, a frame for holding said small pane comprising end closures at each side edge of said small pane and forming therewith a pocket open downwardly, electrical heating means carried by said frame adjacent the bottom open end of said pocket, and means for supporting said frame from the top of the windshield comprising spring tensioned metal straps having a detachable connection with said end closures and adapted to press said end closures against said windshield with the upper edge of the pane closely adjacent the windshield.

4. A warming device for automobile windshields and the like comprising a transparent member and end members forming together with the windshield a downwardly opening pocket of increasing depth from top to bottom in the direction of the windshield, electrical heating means positioned adjacent the open bottom of the pocket and means to hold the device in operative position with respect to the windshield.

5. A warming device for automobile windshields and the like comprising a relatively small pane of transparent material, a frame for the pane including end members shaped to incline the pane downwardly and away from the windshield, said frame and pane forming with the windshield a downwardly opening pocket, electrical heating means in said pocket near the open bottom thereof, and means for supporting the device in operative relation with the windshield.

6. A warming device for automobile windshields and the like comprising a relatively small pane of transparent material, a U-shaped frame for the pane including end members shaped to position the pane so as to form with the windshield an open bottomed pocket, electrical heating means in said pocket adjacent the open bottom thereof and means for holding the device in operative position with respect to the windshield.

7. A warming device for automobile windshields and the like comprising a relatively small pane of transparent material, a U-shaped frame for the pane including end closing members shaped to incline the pane downwardly and outwardly from the windshield so as to space the lower edge of the pane from the windshield and permit the entrance of air to the space between the pane and the windshield, electric heating means supported by the frame adjacent the lower edge of the pane and exposed to the windshield, and means to hold the device in operative position with respect to the windshield.

8. A warming device for automobile windshields and the like comprising a relatively small pane of transparent material, a U-shaped frame for the pane including end closing members shaped to incline the pane downwardly and outwardly from the windshield so as to space the lower edge of the pane from the windshield and permit the entrance of air to the space between the pane and the windshield, electric heating wire supported by the frame adjacent the lower edge of the pane and exposed to the windshield and the current of incoming air, and means to hold the device in operative position with respect to the windshield.

9. A warming device for automobile windshields and the like comprising a relatively small pane of transparent material, a U-shaped frame for the pane including triangular shaped end closure members to position the pane downwardly and outwardly inclined with respect to the windshield, said pane and end closures forming with the windshield a downwardly opening pocket having its top and sides substantially closed, electrical heating means positioned adjacent the open bottom of the pocket and means to yieldingly press the device in operative position against the windshield.

In testimony whereof I have affixed my signature.

CHARLES H. BREWSTER.

CERTIFICATE OF CORRECTION.

Patent No. 1,793,584.  Granted February 24, 1931, to

CHARLES H. BREWSTER.

It is hereby certified that error appears in the printed specification of the above numbered patent requiring correction as follows: Page 2, line 15, after "pocket" insert except for such leakage as occurs at the top; and that the said Letters Patent should be read with this correction therein that the same may conform to the record of the case in the Patent Office.

Signed and sealed this 17th day of March, A. D. 1931.

(Seal)
M. J. Moore,
Acting Commissioner of Patents.